United States Patent [19]

Weisenburger

[11] 3,772,776

[45] Nov. 20, 1973

[54] METHOD OF INTERCONNECTING MEMORY PLANE BOARDS

[75] Inventor: Lawrence P. Weisenburger, Ottsville, Pa.

[73] Assignee: Thomas and Betts Corporation, Elizabeth, N.J.

[22] Filed: Dec. 3, 1969

[21] Appl. No.: 881,784

[52] U.S. Cl. .................... 29/628, 29/471.9, 29/604, 174/117 PC, 339/17 F, 339/17 M, 340/174 M, 340/174 MA, 317/101 CC, 317/101 CM, 317/101 D

[51] Int. Cl. ...................... H01r 43/00, H01b 13/00

[58] Field of Search ....................... 339/176, 19, 17, 339/222, 17 C, 17 F, 17 CF; 340/174 M, 3 DA; 29/624–630, 471.9, 471.7, 604; 317/101; 174/117, 26, 107, 109

[56] References Cited

UNITED STATES PATENTS

| | | | |
|---|---|---|---|
| 2,844,807 | 7/1958 | McMulkin | 29/626 UX |
| 3,259,857 | 7/1966 | Garstang | 174/36 X |
| 3,391,397 | 7/1968 | Birt et al. | 340/3 DA |
| 3,069,753 | 12/1962 | Lalmond et al. | 29/628 UX |

*Primary Examiner*—John F. Campbell
*Assistant Examiner*—R. W. Church
*Attorney*—David Teschner

[57] ABSTRACT

A method of interconnecting parallel circuit boards, including and principally for, memory planes, comprises bonding one end of a flat flexible cable to the edge of a first board, and connecting the word straps or other leads directly to the flat flexible cable. The other end of the flat connector cable is then directly connected to the end of a similar flat flexible conductor cable (connected at its opposite end to the word straps or other leads of a second board), thereby completing the interconnection.

3 Claims, 7 Drawing Figures

PATENTED NOV 20 1973

3,772,776

INVENTOR.
LAWRENCE P. WEISENBURGER
BY
Thomas M. Marshall
ATTORNEY

METHOD OF INTERCONNECTING MEMORY PLANE BOARDS

In the field of sophisticated electronic equipment there are numerous circuit boards, memory planes and the like which are of miniaturized design, and which have to be interconnected in a simple and reliable method, while at the same time maintaining the miniaturization of the system and allowing for testing of the circuit prior to final assembly. Furthermore, memory planes are normally stacked, and interconnected along both the X and Y axes.

A present method for interconnecting the word-lines or leads of a memory plane is by the use of conventional round wire, however this procedure has a primary disadvantage in that it requires an excessive amount of hand soldering and, as the number of stacked memory planes increases, the handling problem becomes acute. Furthermore, in that the first connection to the memory plane must be inspected and tested prior to the final interconnection of two memory planes, this additional handling results in more damage than the memories are normally subjected to in years of use. Furthermore, connection to more than two opposite sides of a memory is extremely difficult, and for this purpose the electrical packaging industry has resorted to greater use of multi-terminal connectors which are relatively large in comparison to the miniaturized memory planes, and are expensive. Another disadvantage of multi-terminal connectors is that in order to connect such a connector to the magnetic wires of a memory plane, it is first necessary to connect the wires to an etched circuit pad formed on the base substrate for the memory. Accordingly, this system of interconnecting memory planes is extremely costly. Furthermore, since the circuit pads are usually etched out of an electrically conductive material bonded to the substrate, the latter must be made of non-electrical material such as reinforced glass fiber board.

Accordingly, it is the object of this invention to provide a means for interconnecting parallel circuit boards or memory planes wherein connections may be made at all sides of the circuit, with soldered or welded connections, as well as enabling testing before and after the final connection.

It is a further object of this invention to provide a method of interconnecting parallel circuit boards which is inexpensive, simple to manufacture and maintains the miniaturized size of the system.

It is still a further object of this invention to provide a method of interconnecting parallel circuit boards or memory planes which allows the use of mass connection techniques, and eliminates the need for etched printed circuit pads, and permits use of other materials for the substrate, such as aluminum for strength and heat conduction.

Briefly, the present invention provides a method of interconnecting memory planes wherein the interconnection employs strips of flat flexible conductor cable, each of which is stripped at each end of insulation on only one side of the cable to expose the conductors. The flat flexible conductor cable is then bonded on one end to the memory plane whereby the exposed conductors may be connected by mass soldering technique to the leads extending from the memory plane. A second flat flexible cable of similar construction is likewise connected to an adjacent memory plane, and the interconnection between the respective leads of the two memory planes is effected by interconnecting the opposite ends of the respective flat conductor cables. If desired, in order to achieve reduced packaging, the flexible flat conductor cables may then be tucked between the boards thereby reducing the overall profile of the interconnection system.

These and other objects of the invention may be more readily appreciated by reference to the following description taken in conjunction with the following figures and appended claims:

Figures 1, 2:
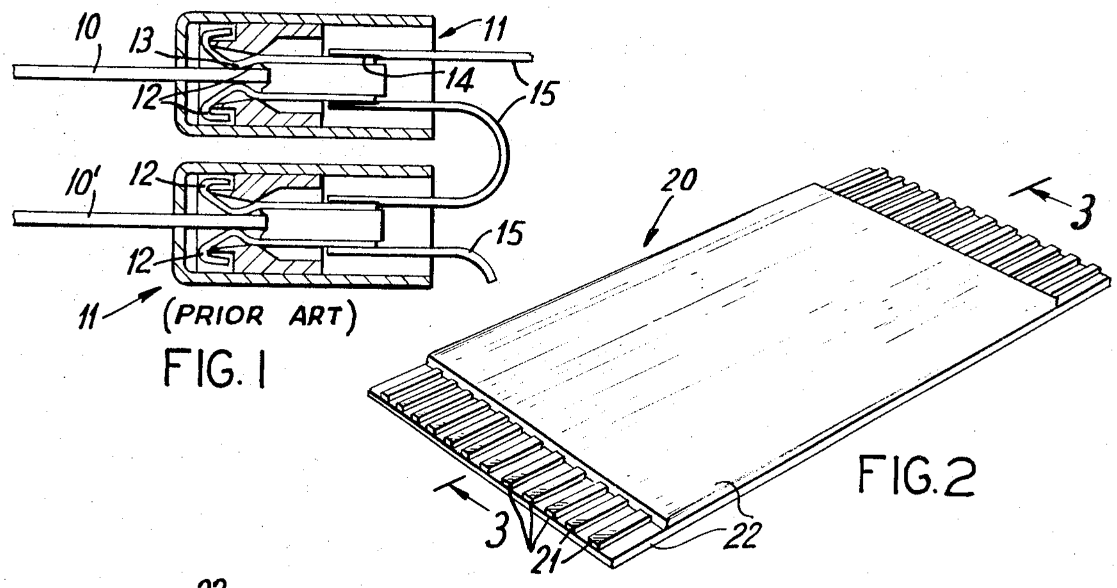
FIG. 1 illustrates a sectional view of the interconnection of two memory planes according to a prior art technique utilizing multi-terminal connectors.
FIG. 2 is a perspective view of a length of flat flexible conductor cable employed in the method of interconnecting memory planes according to the invention.

FIG. 1 illustrates the prior art technique for interconnecting the leads, tunnel wires or the like of two circuit boards such as memory planes 10, 10' utilizing multi-terminal electrical connectors 11, 11. Each multi-terminal connector 11 generally comprises a plurality of contact pins 12, each of which is at one end as at 13, in frictional contact with the printed circuit pads terminating the magnetically coated wires of a memory plane, while its opposite end 14 is connected to a lead of a flat conductor cable 15. In the stacked arrangement of memory planes illustrated in FIG. 1 the leads disposed on the bottom of upper memory plane 10 are connected to the leads disposed on the top of lower memory plane 10'. As is readily apparent, the vertical spacing between the memory planes 10, 10' is dictated by the thickness of the multi-terminal connectors. Hence, in that the presently available multi-terminal connectors are relatively large in comparison to the miniaturized circuitry, the miniaturizing requirement of the system is accordingly compromised. It is primarily this defect in the prior art which is alleviated by the method of the present invention.

Figure 3:
FIG. 3 is a sectional view along lines 3–3 of FIG. 2.

Turning to FIGS. 2 and 3, a strip of flat flexible conductor cable 20 for use in the subject method of interconnecting memory planes comprises a plurality of conductors 21 laminated between two sheets of insulation 22. Adjacent each end of the strip 20, the insulation has been stripped on only one side in order to bare the conductors.

Figure 5:
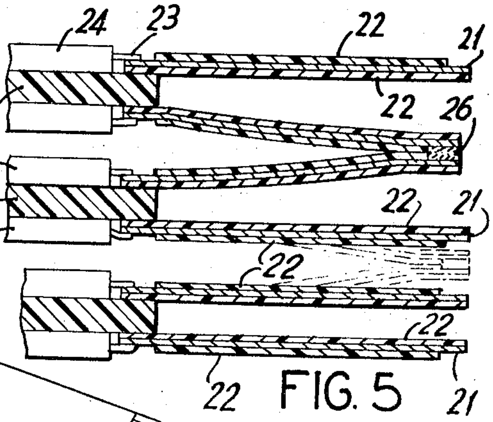
FIG. 5 illustrates the second step of the method of interconnecting two memoyr planes according to the invention.
Figure 4:
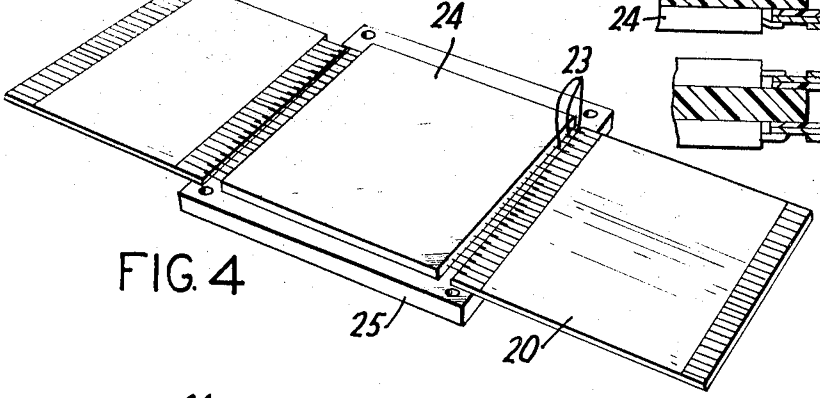
FIG. 4 illustrates a perspective view of the first step of the method of interconnecting two memory planes according to the present invention.

FIGS. 4 and 5 illustrate the connection of the flat flexible conductor cable or jumper 20 to the magnetically coated wires 23 of a tunnel structure 24 (of the type disclosed in U.S. Pat. No. 3,465,432) which is mounted on a plastic substrate 25. The first step in the method is to bond the end of the flat flexible conductor cable 20 to the substrate such that the conductors 21 may be soldered or welded to the magnetically coated wires 23. The next step is to flex two flat flexible conductors (as shown by the dotted lines in FIG. 5) and interconnect the respective conductors of the two cables as at 26 by soldering or welding, to complete the interconnection.

Figure 6:
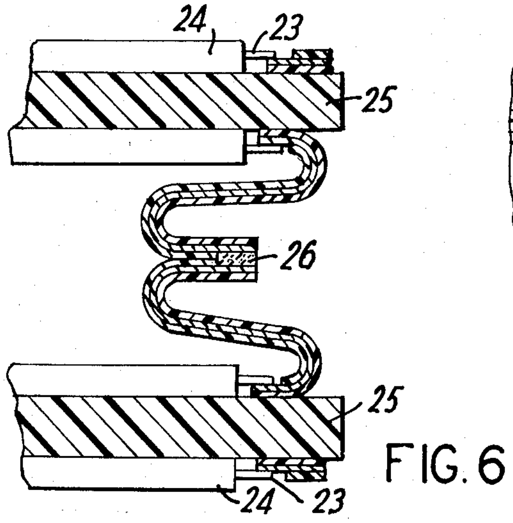
FIG. 6 is an enlarged side view of an interconnection between two memory planes after the interconnected flat conductor cables are "tucked in" between the memory planes.

FIG. 6 illustrates an enlarged view of the interconnection of two memory planes according to the method of the invention, with the additional step of "tucking in" the extended ends of the flat flexible conductor cable or jumper in order to reduce the overall plan geometry of the stacked memory plane. Also, the "tucking in" is effected to prevent damage to the extended flat conductor cable.

The interconnection of the conductors of the flat conductor cable to the leads or tunnel wires of a memory plane may be effected by mass soldering or welding techniques, which will substantially save in costs as compared to present methods employing individual round wires. Furthermore, the reliability of a mass soldered or welded technique is greater than the interconnecting of individual wires. It is also noted that after completion of the first steo illustrated in FIG. 4 of the subject method, the connection between the flat flexible conductor cable 20 and the leads 23 of the tunnel structure 24 may be tested prior to continuing on with the next step in the operation. This capability of testing each connection during the assembly of the system is very desirable, and when considering the number of interconnections in a sophisticated electronics system, necessary, for developing a reliable system.

As previously mentioned, when employing a multiterminal connector as illustrated in FIG. 1 it is first necessary to connect the individual tunnel wires of a tunnel structure to etched circuitry formed on the substrate. Accordingly, the substrate is usually made of a nonmetallic material such as a glass fiber board, which both adds to the cost of the assembly, and does not provide the strength or heat conduction that a metallic substrate is capable of providing. On the other hand, using the method of the present invention, since the employment of etched circuity is not required, the substrate 25 may be made of any material, including aluminum, for strength and heat conduction.

Although the above described method only illustrates the interconnection of two memory planes along one axis, it is readily appreciated that interconnection along both the X and Y axes may be effected for the use of the subject method. The method of the present invention allows mass soldering methods to be used in attaching each half "jumper" or flat flexible conductor cable to its associated circuit board, then stacking a mechanical assembly into a cubic shape, which is easy to handle, before mass soldering of each half "jumper" to its mate. Once again, testing and inspection of each board can be done without excessive handling, and access to the final interconnection between boards allows for easy inspection of the final assembly.

Figure 7:
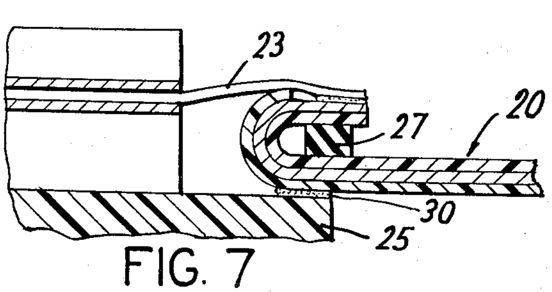
FIG. 7 is an alternate method of bonding the flexible flat conductor cable to the memory plane.

In those cases where thereis significant thermodifferential expansion between the memory plane and the substrate, the technique for interconnecting the humper 20 to the magnetically conductive tunnel wire 23 of the tunnel structure illustrated in FIG. 7 may be employed. In this case the jumper 20 is bent 180° at its end and bonded as at 30 to the substrate. A small block 27 of flexible material is then adhesively bonded to the inner surfaces of the jumper in the region of the U-shape. The block may be made of any flexible type of material such as a foam plastic or rubber, and during thermal expansion and contraction of the substrate 25, the resilient material 27 effectively shears thereby providing the strain relief required by the delicate magnetically coated wires 23.

Although any of the standard materials used in preparing flat flexible conductor cable may be employed, it is suggested that the insulation film used in making the jumper 20 be made of a polyimide which allows soldering connection directly to the cable due to the high melting temperature of the polyimide material.

A method of interconnecting circuit boards described above is effective in that it uses one end of a flat flexible conductor cable as both the pad for connection to the circuitry and additionally provides a bond of the jumper to the memory plane. The method allows connections to be made at all sides of the circuit with soldered or welded connections, as well as providing means of testing before and after the final connection. The method also allows the use of mass connection techniques with suitable equipment, and eliminates the need for a printed circuit board, and permits use of other materials for the substrate, such as aluminum for strength and heat conduction.

Having thus described the invention, it is not intended that it be so limited as changes may be readily made therein without departing from the scope of the invention. Accordingly, it is intended that the abstract of the disclosure and the subject matter described above and shown in the drawings be interpreted as illustrative and not in a limiting sense.

What is claimed is:

1. A method of interconnecting two printed circuit boards comprising the steps of:
 - bending one end of a first strip of flat flexible conductor cable, stripped of the insulation on one side adjacent the ends thereof, in a generally U-shape;
 - bonding said first strip of flat flexible conductor cable intermediate its ends to a first circuit board;
 - connecting the bent-over end of said first strip of flat flexible conductor cable to the circuitry on said first circuit board;
 - bending one end of a second strip of flat flexible conductor cable, stripped of insulation on one side adjacent the ends thereof, in a generally U-shape;
 - bonding said second strip of flat flexible conductor cable intermediate its ends to a second circuit board;
 - connecting the bent-over end of said second strip of flat flexible conductor cable to the circuitry on said said second circuit board; and
 - interconnecting the opposite ends of said first and second strips of flat flexible conductor cables to complete the interconnection.

2. A method of interconnecting two printed circuit board comprising the steps of:
 - providing two strips of flat flexible multi-conductor cable, each multi-conductor cable stripped of the insulation on one side adjacent the ends thereof;
 - bonding the insulated surface of one end of each cable to a respective circuit board;
 - electrically connecting and bonding the circuitry of each board to the respective conductors of the adjacent flat flexible multi-conductor cable; and
 - electrically interconnecting and bonding the opposite ends of said flat flexible multi-conductor cables to complete the interconnection.

3. A method of interconnecting two printed circuit boards as in claim 2, wherein the boards are disposed in parallel relationship, and including the additional step of tucking the interconnected flat flexible multi-conductor cables between said circuit boards.

* * * * *